L. P. JUDSON, Dec'd.,
WASHBURN & MOEN MANUFACTURING COMPANY, assignee by mesne assignments.
FENCE.
No. 10,313. Reissued Apr. 10, 1883.
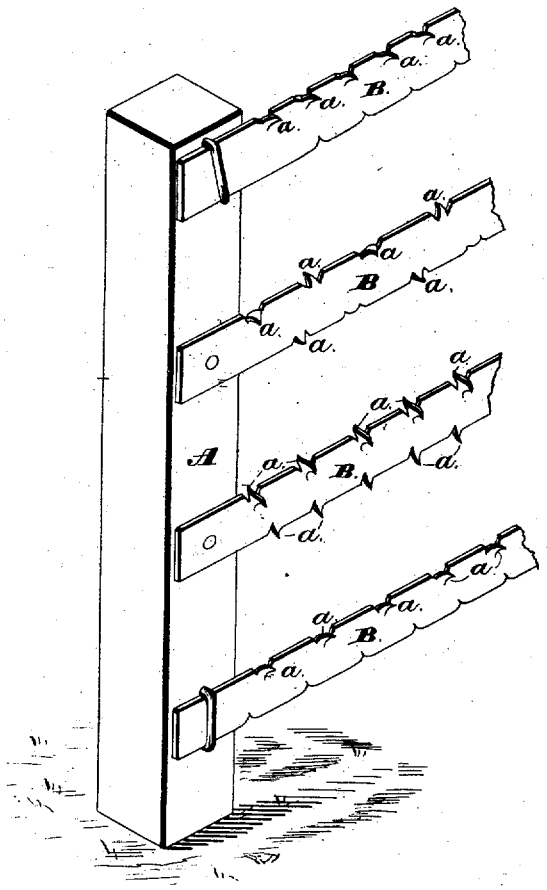
Witnesses:
Jas. E. Hutchinson.
Robert Everett,
Washburn & Moen Mnf'g Co,
Assignee of
Lyman P. Judson, dec'd
Inventor,
By James L. Norris.
Attorney.
N. PETERS, Photo-Lithographer, Washington, D. C.

UNITED STATES PATENT OFFICE.

WASHBURN & MOEN MANUFACTURING COMPANY, OF WORCESTER, MASS., ASSIGNEE, BY MESNE ASSIGNMENTS, OF LYMAN P. JUDSON, DECEASED.

FENCE.

SPECIFICATION forming part of Reissued Letters Patent No. 10,313, dated April 10, 1883.

Original No. 118,135, dated August 15, 1871; Reissue No. 8,096, dated February 19, 1878. Application for reissue filed January 23, 1883.

*To all whom it may concern:*

Be it known that LYMAN P. JUDSON, of Rose, in the county of Wayne and State of New York, did invent a certain new and useful Improvement in Fences, of which the following is a specification.

This fence is of that class in which hoop or band iron is employed in the place of rails; and the invention consists in forming the edges of the lengths with sharp spurs or points, in the manner and for the purpose hereinafter set forth.

In the drawing, the figure is a perspective view of the improved fence.

A represents one of the posts, and B B B B the several lengths of hoop or band iron employed in place of rails. These lengths are preferably from an inch to an inch and a half in width each, and are attached to the posts by nails, screws, staples, or any other desired means; or they may pass through holes of the posts.

Fences formed with hoop or band iron have been before known; but, so far as he was aware, the edges of the same were straight and unbroken. As an improvement upon this he formed the edges with spurs or sharp points *a a*, which are cut from the edges of the bands and bent outward to a suitable angle to the surface, as shown. Several different forms of the spurs are shown. Others may be used; but he preferred that shown in the top and bottom lengths, as being more effective and being less liable to become broken. In that case the edges of the bands are cut in angularly at suitable intervals by running through a die, and the points formed by the cuts bent outward, one edge bent in one direction and the other in the other. In the second length from the top regular saw-teeth are formed and bent outward. In the second length from the bottom the edge is cut angularly in opposite directions, but not quite through, and the teeth or spurs are turned angularly, so as to present projecting points on both sides.

The advantage of the arrangement above described is, that the lengths present an armed or barbed surface, which is effective in keeping animals at a proper distance. They will not venture in contact with such a formidable obstacle in their way. Hogs will not attempt to pass under nor cattle and horses to jump over. Neither will they endeavor to reach through. It is therefore more effective than a board fence. Being made of broad bands, it is always apparent to sight, which gives it a greater advantage over simple wire. Besides, it has greater strength and firmness.

In the employment of this fence there is no use for pokes and hampers on animals, as the spurs or barbs of the fence serve a more effective purpose.

This fence has great solidity and strength, and when properly secured is not affected by heat or cold, as is the case with wire. The band-iron will not sag sufficiently to impair its value, and being so wide it can rest comparatively loose. If desired, wire of large size may be used in a similar way, having the points cut from its surface and projecting outward.

The use of hoop or band iron is not broadly claimed, nor are spurs or barbs claimed except as they are cut from the edge of the bands themselves and turned outward.

What is claimed is—

1. A fence made with hoop or band iron, in which the edges of the lengths are cut and formed into projecting spurs or barbs, as and for the purpose specified.

2. Metallic lengths for fencing purposes, having their edges cut and formed into projecting spurs or barbs, substantially as and for the purpose specified.

WASHBURN & MOEN MFG. CO.,
By PHILIP L. MOEN,
*President.*

Witnesses:
WM. K. CROSBY,
A. H. STONE.